(12) United States Patent
Abel et al.

(10) Patent No.: US 8,014,722 B2
(45) Date of Patent: *Sep. 6, 2011

(54) PROVISIONING OF WIRELESS CONNECTIVITY FOR DEVICES USING NFC

(75) Inventors: Miller T. Abel, Mercer Island, WA (US); Shai Guday, Redmond, WA (US); Benjamin E. Nick, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,401

(22) Filed: Dec. 14, 2009

(65) Prior Publication Data
US 2010/0093278 A1   Apr. 15, 2010

Related U.S. Application Data

(63) Continuation of application No. 11/159,605, filed on Jun. 23, 2005, now Pat. No. 7,657,255.

(51) Int. Cl.
*H04M 3/42* (2006.01)

(52) U.S. Cl. .............. 455/41.1; 455/41.2; 455/414.1; 455/432.2; 709/246; 370/259

(58) Field of Classification Search ........... 455/414.1, 455/432.2, 466, 411, 433, 436; 709/246; 370/259, 260, 328
See application file for complete search history.

(56) References Cited

U.S. PATENT DOCUMENTS

| | | |
|---|---|---|
| 5,339,432 A | 8/1994 | Crick |
| 5,507,810 A | 4/1996 | Prewett et al. |
| 5,607,476 A | 3/1997 | Prewett et al. |
| 5,613,123 A | 3/1997 | Tsang et al. |
| 5,713,959 A | 2/1998 | Bartlett et al. |
| 5,733,337 A | 3/1998 | Carr, Jr. et al. |
| 5,922,028 A | 7/1999 | Plouhar et al. |
| 5,923,757 A | 7/1999 | Hocker et al. |
| 5,964,807 A | 10/1999 | Gan et al. |
| 5,980,504 A | 11/1999 | Sharkey et al. |
| 6,007,570 A | 12/1999 | Sharkey et al. |
| 6,025,538 A | 2/2000 | Yaccarino, III |

(Continued)

FOREIGN PATENT DOCUMENTS

EP    0869651 A1    10/1998

(Continued)

OTHER PUBLICATIONS

"IEEE Standard for Information Technology-Telecommunications and Information Exchange, Between Systems-Local and Metropolitan Area Networks-Specific Requirement. Part 11: Wireless LAN Medium, Access Control (MAC) and Physical Layer (PHY) Specification", ISO/IEC 8802-11, 1999, pp. 1, 34-58.

(Continued)

*Primary Examiner* — Minh D Dao
(74) *Attorney, Agent, or Firm* — Woodcock Washburn LLP

(57) ABSTRACT

The claimed subject matter provides a system and/or a method that facilitates connecting a wireless device to a secure network. A device can establish a near field communication link with a verified device on a network, wherein the near field communication link can be a secure and/or encrypted link to provision the device without comprising security constraints within the network. An installation component can invoke the transfer of provisioning data to the network via the near filed communication link to secure a wireless connection for the device to the network.

23 Claims, 11 Drawing Sheets

U.S. PATENT DOCUMENTS

| | | | |
|---|---|---|---|
| 6,073,051 | A | 6/2000 | Sharkey et al. |
| 6,077,989 | A | 6/2000 | Kandel et al. |
| 6,080,194 | A | 6/2000 | Pachence et al. |
| 6,095,149 | A | 8/2000 | Sharkey et al. |
| 6,099,514 | A | 8/2000 | Sharkey et al. |
| 6,122,549 | A | 9/2000 | Sharkey et al. |
| 6,123,731 | A | 9/2000 | Boyce et al. |
| 6,126,682 | A | 10/2000 | Sharkey et al. |
| 6,140,452 | A | 10/2000 | Felt et al. |
| 6,567,915 | B1 | 5/2003 | Guthery |
| 6,609,199 | B1 | 8/2003 | DeTreville |
| 6,643,774 | B1 | 11/2003 | McGarvey |
| 6,678,516 | B2 | 1/2004 | Nordman et al. |
| 6,721,555 | B1 | 4/2004 | Phillips et al. |
| 6,795,688 | B1 | 9/2004 | Plasson et al. |
| 7,208,843 | B2 | 4/2007 | Richling et al. |
| 7,469,151 | B2 * | 12/2008 | Khan et al. ............... 455/558 |
| 7,657,255 | B2 | 2/2010 | Abel et al. |
| 2001/0049263 | A1 | 12/2001 | Zhang |
| 2002/0023215 | A1 * | 2/2002 | Wang et al. ............... 713/171 |
| 2003/0172271 | A1 | 9/2003 | Silvester |
| 2004/0122649 | A1 | 6/2004 | Bartek et al. |
| 2005/0066044 | A1 | 3/2005 | Chaskar et al. |
| 2005/0070329 | A1 | 3/2005 | Lection et al. |
| 2005/0111420 | A1 | 5/2005 | Fujii |
| 2005/0120096 | A1 | 6/2005 | Rekimoto et al. |
| 2005/0266798 | A1 | 12/2005 | Moloney et al. |
| 2006/0183462 | A1 * | 8/2006 | Kolehmainen ............... 455/411 |
| 2007/0073929 | A1 * | 3/2007 | Takayama et al. ............ 710/51 |
| 2008/0162088 | A1 * | 7/2008 | DeVaul et al. ............... 702/190 |
| 2008/0207172 | A1 * | 8/2008 | Eguchi et al. ............... 455/411 |
| 2009/0222659 | A1 * | 9/2009 | Miyabayashi et al. ........ 713/156 |
| 2009/0298577 | A1 * | 12/2009 | Gagner et al. ............... 463/25 |

FOREIGN PATENT DOCUMENTS

| | | | |
|---|---|---|---|
| EP | 1233337 A2 | | 8/2002 |
| JP | 2004364145 A | * | 12/2004 |
| RU | 2 276 474 | | 5/2006 |
| WO | WO 02/51106 A1 | | 6/2002 |

OTHER PUBLICATIONS

"Near filed communication(NFC)", White Paper, ECMA publication (ECMA/TC32-TG19/2004/1), Geneva, Dec. 31, 2004, 9 pages.

Corner et al., "Zero-Interaction Authentication", Proceedings of the 8th Annual International Conference on Mobile Computing and Networking, Atlanta, Georgia, Sep. 23-28, 2002, 1-11.

EP Application No. 05112925: European Search Report, Apr. 28, 2006, 4 pages.

EP Application No. 05112925: European Search Report, Jul. 7, 2006, 9 pages.

Molva et al., "Authentication Method with Impersonal Token Cards", IEEE Computer Society Symposium on Research in Security and Privacy, Oakland, CA , USA, May 24-26 1993, 1-10.

Samar, "Unified Login with Pluggable Authentication Modules (PAM)", Proceedings of the 3rd ACM Conference on Computer and Communications Security, New Delhi, India, Mar. 14-16, 1996, 1-10.

* cited by examiner

PROVISIONING OF WIRELESS CONNECTIVITY FOR DEVICES USING NFC

CROSS REFERENCE TO RELATED APPLICATION

This application is a Continuation of U.S. patent application Ser. No. 11/159,605 filed Jun. 23, 2005.

BACKGROUND

Computer products and other networking equipment have emerged as one of the largest and fastest growing industries. With the rapid improvements made within the industry, electronic manufacturers continuously strive to satisfy the ongoing demand for products providing functionality without restrictions such as, for example, size, power consumption, compatibility, ergonomics, software capability, lifetime, range, productivity, usable-interface, security, speed, portability, etc.

One restriction the electronic industries have vastly improved upon is providing a range or degree of freedom associated with employment of wireless networks and/or devices. Wireless networks and/or devices such as, but not limited to, wireless local area networks (WLAN), Bluetooth, local area network (LAN), subnetworks (e.g., wireless mouse and personal computer), portable digital assistants (PDAs), mice, keyboards, speakers, monitors, routers, phones, cellular communication devices, wireless devices, access points, hubs, ... facilitate functionality with mitigation of wires and accompanied restrictions. In addition to providing degree(s) of freedom, wireless devices and/or networks are advantageous to hard-wired networks and/or devices for numerous reasons. Wireless systems are pleasing to the eye since the clutter of unwanted hard-wires is eliminated. For instance, plasma flat-screen televisions involve mounting on a wall similar to that of a painting mounted to a wall. By utilizing a wireless method and/or system, the wires for the television would not be seen hanging from the wall, and the result is a more pleasant looking, wall-mounted television. Furthermore, a hard-wire is a physical restriction by limiting the range of the device and/or network with the actual length of the wire. For example, a hard-wired Ethernet connection for a laptop can only be utilized within physical constraints of length of the Ethernet cable. Additionally, hard-wires have to be connected, which can involve matching an endless amount of plugs and connectors.

Not only are wireless networks and/or devices employed within the personal computer realm (e.g., wireless keyboards, mice, speakers, ... ), but common households are increasing use of wireless home networks and/or devices. For example, broad-band connections are becoming more affordable for home users in which multiple personal computers anticipate connectivity. Dependant upon location of the personal computers, a network can be employed in order to distribute and utilize the broad-band connection. However, common problems of using hard-wires for the network can arise (e.g., cost, degree of freedom, eye-pleasing, ... ). Thus, wireless networks and/or devices can be utilized in order to cure the foregoing problems.

Although benefits are apparent for wireless networks and/or devices, many problems arise involving installation of such products. With the increasing number of wireless networks, a difficulty arises to install a wireless device with a particular network entity (e.g., wireless mouse with a personal computer, wireless speakers with a receiver, wireless access point with a router, ... ). Additionally, the network entity does not know when to install a wireless device and/or what wireless device to install. Moreover, a wireless device usually needs to be within range of the network entity in order to be detected and installed.

Another complex problem involving wireless networks and/or devices involves security and authentication. Although wireless networks and/or devices provide a vast amount of benefits, a hard-wire network and/or device is typically more secure based at least upon the physical connection assumed to be authenticated. On the contrary, wireless networks and/or devices are prone to "sniffing" (e.g., the act of eavesdropping on messages such as, but not limited to, confidential business data or passwords in transit) and other hack techniques (e.g., port scanning, transfer communication protocol (TCP) spoofing, user datagram protocol (UDP) spoofing, TCP session spoofing, ... ) which are utilized in order to intrude and exploit the network security.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate provisioning at least one device to a network entity, a verified device, and/or a network itself Moreover, the subject innovation relates to systems and/or methods that facilitate establishing an ad-hoc network between two devices for the purpose of connectivity there between. An installation component can employ provisioning data related to a particular device that is to be connected securely to a specific network and/or verified device. The installation component can invoke such provisioning data through a near field communication (NFC) link, wherein the NFC link is a secure, short proximity, and encrypted link capable of being a trusted medium. It is to be appreciated that the encryption utilized can be a handshake (e.g., 4 way handshake) to establish a secure link on top of 'an "open" NFC channel. After the provisioning data is exchanged with the network, the device can establish a wireless connection (e.g., wireless local area network, Bluetooth, wireless fidelity, ultra wideband, ... ) therewith. The device can be any device capable of wireless connectivity and NFC capability. Moreover, the verified device can be any device that has been previously securely connected to a network that contains at least one wireless connection. In one aspect described herein, a verified master device can be utilized for any and/or all provisioning of wireless devices to a wireless connection on a particular network.

In accordance with one aspect of the claimed subject matter, the installation component can utilize a PONG component. The PONG component can provide a generic data transfer technique that allows provisioning data to be transferred to the network such that a device can be installed and/or authenticated on such network. The plug and go (PONG) technique is generic as to allow any device to be provisioned with any suitable wireless connection such as, but not limited to, a wireless local area network (WLAN), Bluetooth, wireless fidelity (Wi-Fi), ultra-wideband (UWB), etc. The PONG component can utilize, for example, a PONG manager, a PONG handler, a PONG driver, and PONG data (e.g., PONG request, PONG response, ... ).

In accordance with another aspect of the claimed subject matter, the installation component can further include a security component. The security component can provide an additional layer of security in relation to determining whether the near field communications link is to be utilized to transfer provisioning data. Although the NFC link is a secure and encrypted channel, the security component can provide an additional layer of security to verify implantation of the NFC link authentication technique. For instance, the security component can utilize various security techniques such as, but not limited to, a user name and password, personal identification number (PIN), a login, time-based proximity, biometric indicia (e.g., fingerprint, inductance, retina), human interactive proofs (HIPS), voice recognition, etc.

In accordance with another aspect of the innovation described herein, the installation component can include a manager component that manages various aspects associated with the devices, connections, links, etc. of the claimed subject matter. The manager component can also determine whether a device should be associated with a wireless connection based at least in part upon an analysis of other available wireless connections within the network. In other aspects of the claimed subject matter, methods are provided that facilitate connecting a wireless device to a network.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION OF ILLUSTRATIVE EMBODIMENTS

Figure 1:
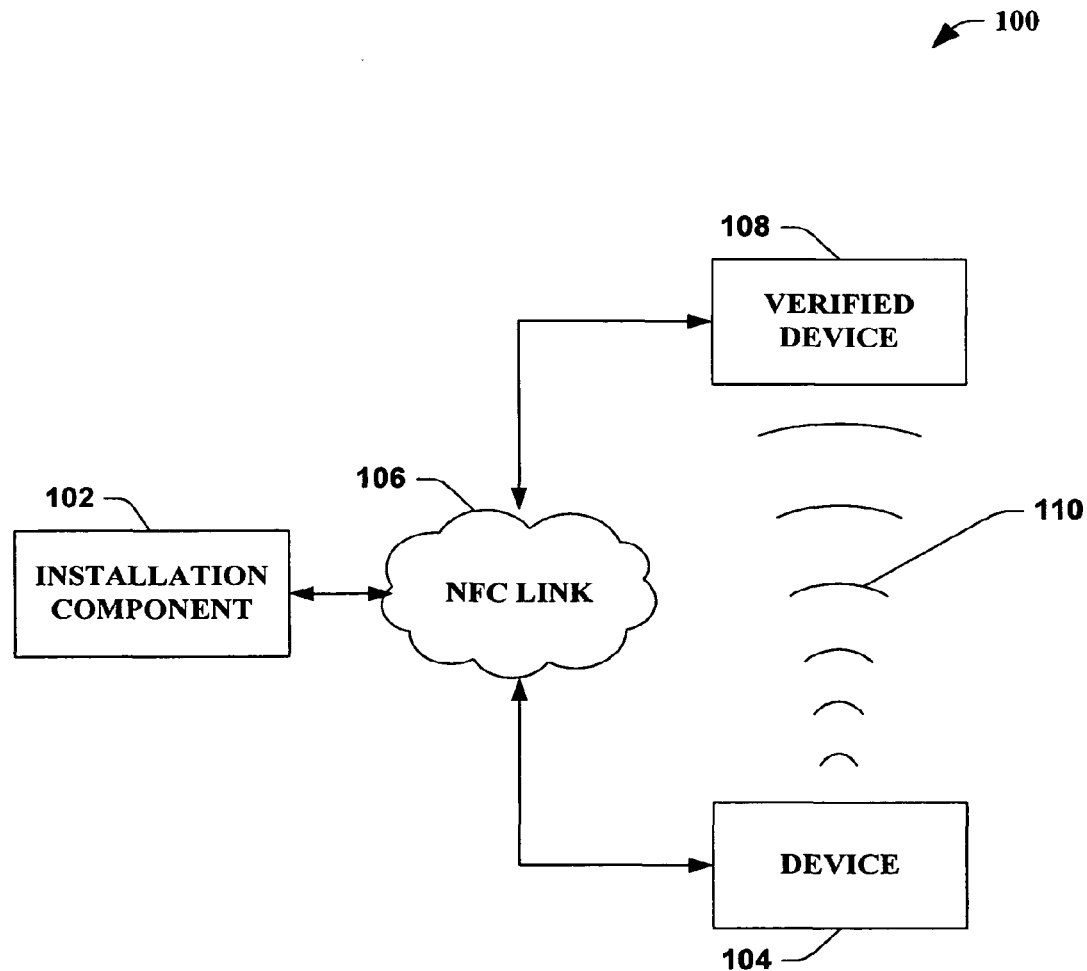
FIG. 1 illustrates a block diagram of an exemplary system that facilitates provisioning a wireless device utilizing a near field communications link as a trusted medium.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates provisioning a wireless device utilizing a near field communication link as a trusted medium. An installation component 102 can invoke provisioning data (e.g., installation protocols, authentication protocols, data related to acquiring a connection with a particular network, device configuration data, device related data, . . . ) that relates to a device 104 via a near field communication link 106 such that a wireless connection 110 is established between the device 104 and a verified device 108 that can be associated with a network (not shown). It is to be appreciated and understood that the verified device 108 need not be connected directly to the NFC link 106, yet the verified device 108 can be previously configured to the particular network in order to provision the device 104. Moreover, it is to be appreciated that the installation component 102 can be connected and/or associated with the particular network (not shown), and such depiction in FIG. 1 is not so limiting on the claimed subject matter.

The device 104 can be any device (e.g., a computer, a network, wireless keyboard, speaker, mouse, monitor, headset, headphones, remote, router, access point, printer, hard drive, modem, microphone, phone, cellular communication device, portable digital assistant (PDA), . . . ) that can employ a near field communication link 106 and anticipates establishing a wireless connection with a larger proximity. Furthermore, the verified device 108 can be any suitable device (e.g., wireless keyboard, speaker, mouse, monitor, headset, remote, router, access point, printer, hard drive, modem, microphone, phone, cellular communication device, portable digital assistant (PDA), . . . ) previously connected in a secure manner to a network (not shown). In other words, the wireless connection 110 can be established between the device 104 and the verified device 108 based at least in part upon the exchange of provisioning data (e.g., in at least one of a schematized or binary form) utilizing the near field communications (NFC) link 106. Moreover, the installation component 102 can facilitate establishing an ad-hoc network between two devices for the purpose of connectivity there between. It is to be appreciated that the installation component 102 can be a standalone component, incorporated into the verified device 108 and/or device 104, and/or any combination thereof.

For example, a wireless keyboard (e.g., the device 104) can utilize the near field communication link 106, wherein the installation component 102 can invoke provisioning data to a PC (e.g., the verified device 108). By utilizing the installation component 102 and exchanging the provisioning data via the NFC link 106 the wireless connection 110 to such network can be established without compromising security constraints associated with the wireless connection 110 and/or network. Once the wireless keyboard is provisioned with the network and/or the verified device 108, the keyboard itself can be considered a verified device 108 from which other devices can be provisioned. It is to be appreciated that the NFC link 106 can be considered a trusted medium for which the installation component 102 can transfer (utilizing the NFC link 106) any suitable provisioning data to allow the device 104 to connect to the network. Moreover, it is to be appreciated and understood that the wireless connection 110 can be any suitable wireless connection associated with the device 104 and/or the verified device 108 where the network can be, but is not limited to being, a wireless local area network (WLAN), Bluetooth, wireless fidelity (Wi-Fi), and ultra-wideband (UWB).

It is to be appreciated that the device 104 and the verified device 108 utilize the short proximity NFC link 106 to securely exchange provisioning data to establish the wireless connection 110 which has a greater communication range when compared to the NFC link 106. The NFC link 106 can be understood and recognized as a short range wireless technology usable for the provisioning of network connectivity without requiring additional hardware and/or battery power. Moreover, the NFC link 106 can establish a secure and/or encrypted link over short distances (e.g., 1 to 2 centimeters, . . . ) between the device 104 and the verified device 108. It is to be appreciated that the encryption utilized can be a handshake (e.g., 4 way handshake) to establish a secure link on top of an "open" NFC channel associated with the NFC link 106.

In another example, a wireless mouse can be substantially similar to a device 104 that can establish a secure link via NFC link 106 to a wireless keyboard that can be considered a verified device 108 part of a secured network with security constraints. NFC link 106 can be a trusted medium that securely exchanges any provisioning data related to the wireless mouse to the verified device 108 (in this example, the wireless keyboard). It is to be noted that the exchange of provisioning data allows the secure installation and/or connection of the wireless mouse to the secured network that contains the wireless keyboard.

In yet another example, a wireless adapter can communicate with a wireless router to provide a broad-band connection via, for example, a digital subscriber line (DSL). The wireless adapter can be connected to the wireless router via NFC link 106 for a secure/encrypted link over a short distance. The short distance connection can provide provisioning data (e.g., installation protocol, authentication protocol, . . . ) necessary via the installation component 102 for the wireless adapter and the wireless router to utilize the wireless connection 110. Upon completion of the installation and/or authentication (e.g., transfer of the provisioning data by utilizing the NFC link 106 and/or the installation component 102), the wireless adapter can be disengaged (e.g., placed out of NFC range and/or proximity) from the wireless router. Once disengaged, the wireless adapter and the wireless router can utilize the wireless connection 110 based at least in part upon being authenticated, verified, and/or secured without compromising security constraints. By utilizing NFC link 106, the wireless router is aware of the wireless adapter being installed; the wireless adapter is aware of the wireless router upon which it is being installed; and the security of authentication and installation is heightened.

Moreover, the system 100 can include any suitable and/or necessary interface component (not shown), which provides various adapters, connectors, channels, communication paths, etc. to integrate the installation component 102 into virtually any operating and/or database system(s). In addition, the interface component can provide various adapters, connectors, channels, communication paths, etc., that provide for interaction with the installation component 102, the verified device 108, NFC link 106, and the device 104.

Figure 2:
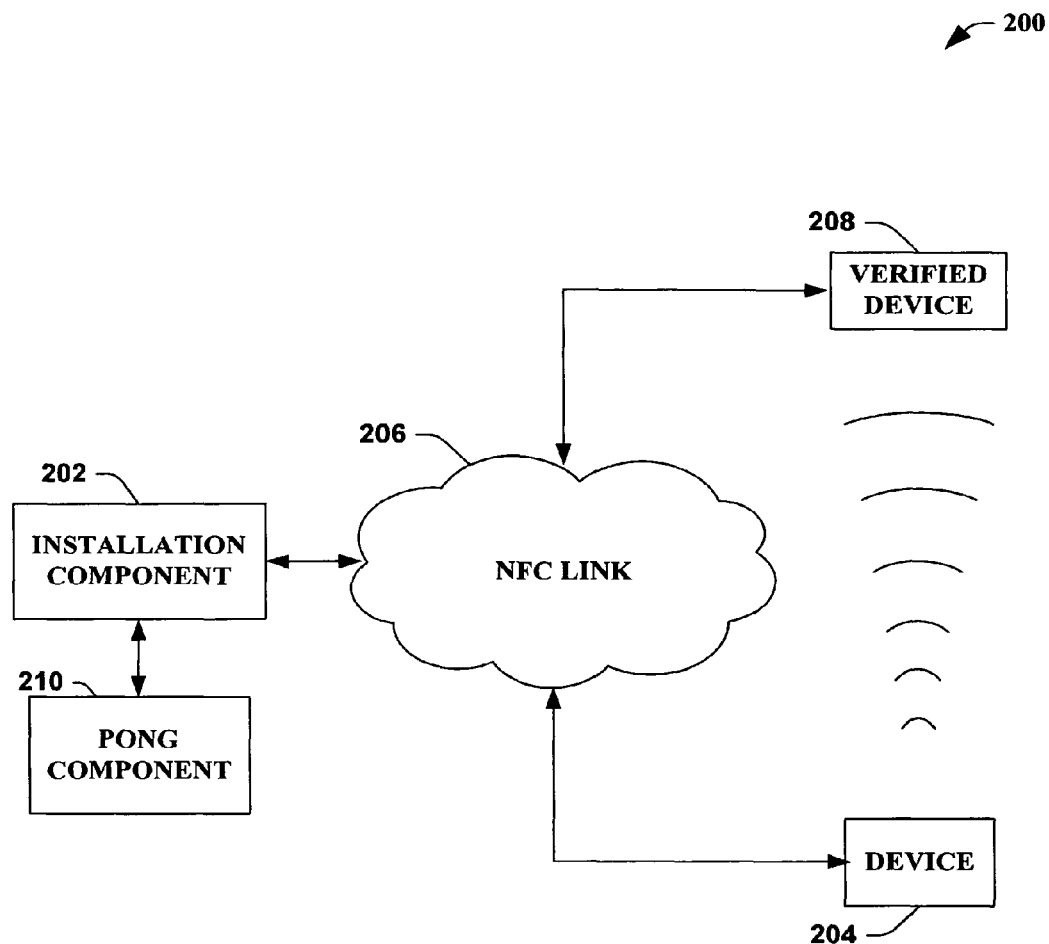
FIG. 2 illustrates a block diagram of an exemplary system that facilitates securely installing a device to a network by invoking near field communication link and a PONG channel.

FIG. 2 illustrates a system 200 that facilitates securely installing a device to a network by invoking a near field communications link and a pong channel. An installation component 202 can invoke provisioning data to be exchanged over a NFC link 206 to connect a device 204 to a network (not shown) and/or a verified device 208. The exchange of provisioning data over the NFC link 206 can ensure a secure link based at least in part upon the NFC link 206 being an encrypted link over short distances with a relatively high bandwidth. The provisioning data can ensure the authentication and/or installation of any device that is to be installed on a secure network, wherein the verified device is associated with such secure network. Once the device 204 is provisioned with the network through the NFC link 206, the device 204 can utilize a wireless connection associated with the verified device 208 and/or the network, wherein the wireless connection can be, but is not limited to, a wireless local area network (WLAN), Bluetooth, wireless fidelity (Wi-Fi), ultra-wideband (UWB), etc. It is to be appreciated that the device 204 can utilize the NFC link 206 as a trusted medium to exchange provisioning data with any device and/or network entity that has NFC capabilities and is associated with the network. Moreover, it is to be appreciated and understood that the verified device 208 need not be connected directly to the NFC link 206, yet the verified device 208 can be previously configured to the particular network in order to provision the device 204.

The NFC link 206 can be a trusted medium for provisioning data exchange to establish a secure and/or authenticated wireless connection for any device onto a particular network by utilizing a PONG component 210. The PONG component 210 can implement a plug and go (PONG) architecture to relate a device with a host system (e.g., verified device, network entity, . . . ). The PONG architecture can include a handler, a driver and a PONG manager, wherein each component can be loaded in a single service process. Each component is described with more detail below. It is to be appreciated that the PONG component 210 is one example of transferring information over the NFC link 206 as a trusted medium, and that various other techniques can be considered under the scope of the claimed subject matter. Yet, the implementation of the PONG component 210 allows for a generic technique, wherein the use of NFC link 206 as a trusted medium can be naturally extended to any other suitable wireless media types such as, but not limited to, Bluetooth and UWB.

The PONG manager can be the central component that facilitates passing data to the correct parties. Based on driver registration, the PONG manager can load the driver files (e.g., .dll file) into the manager's process. When the PONG manager receives a PONG request block from a driver, it looks at the request block header and loads the appropriate PONG handler for that request type. The request block can then be given to the handler for processing. Once the handler is finished, a PONG response block is returned to the driver through the PONG manager.

The PONG driver is responsible for interfacing with either some form of hardware or another software component. The PONG driver is responsible for channeling requests from the PONG manager to the PONG device (e.g., a device that sends PONG request data to the PONG host and receives PONG response(s)) over the trusted medium (e.g., NFC link 206). The driver can detect when a new PONG request should be issued and it either retrieves or generates the request. This request is passed to the PONG manager who can return a PONG response to the driver. It is to be appreciated that multiple PONG handlers can utilize the same PONG driver (e.g., multiple target medium can utilize the same trusted medium). The PONG driver can simply utilize the header for any details on a PONG request clock or PONG response block.

The PONG handler can interface with the service that implements device installation. The PONG handler can be directly related to the target medium (e.g., NFC link 206) and can be the component that has explicit knowledge of the PONG request block for that specific target medium. When the PONG handler receives the PONG request block from the PONG manager, it can parse the contents to determine an appropriate action.

Furthermore, the PONG data can include PONG requests and PONG responses that are organized in a parse-able stream. The stream can consists of a series of PONG attributes, wherein each attribute has a defined type and associated data. This technique, rather than opposed flat structure with pre-defined offsets, provides for easy expansion. It is to be appreciated that a PONG attribute is a single item within a PONG request and/or a PONG response.

The PONG request can be a series of PONG attributes. The first attribute can be an association type that can be utilized to identify which PONG handler the request is to be directed to. The value can be a GUID that is defined by the PONG handler. For instance, to associate with a Bluetooth device, there can be a Bluetooth specific GUID, and a PONG handler that has specified that it handles that particular GUID. The second attribute in the PONG request can be the length. This is the total length of all the attributes in this request including the association type and length field itself. This can be utilized to aide in parsing, such that if a component is not interested in a specific association type, it can skip over the whole thing as opposed to having to parse each attribute with it.

The attribute(s) that follow the length can be defined such that simple devices can implement basic association with minimal processing. Independent hardware vendors (IHVs) may want to make silicon-only solutions without firmware, so being able to simply jump to a pre-defined offset in a structure in order to extract desired data as necessary. So the attributes immediately following the length can contain the minimal amount of data needed to carry out basic association. The attributes can also be laid out in a pre-defined order. In fact, it may be desirable to have a vast majority of this data contained within a single attribute. Note that any variable length fields can be at the end of these basic attributes; otherwise the offset in the PONG request can change. Any number of attributes may follow in order to provide extended functionality.

The PONG Response can be a series of PONG attributes. The first attribute can be the association type. This is used to echo the association type of the PONG request that resulted in this response. The second attribute in the PONG response can be the length. This is the total length of all of the attributes in this request including the association type and length field itself. This is used to aide in parsing, so that if a component is not interested in a specific association type, it can skip over the whole response as opposed to having to parse each attribute within it.

The third attribute of the PONG response can be the association status. This is to notify the PONG device as to the result of the PONG request. If the Association process was successful, then this value will be 0x0000, meaning that the device can continue to read the attributes in the response. If the value is 0xc0001, then the PONG host could not find a PONG handler that can handle the specified association type. In this case, the device may not make any assumptions about further attributes in the PONG response.

The attribute(s) following the association status can be defined very carefully. There is a goal to allow simple devices to be able to implement basic association with minimal processing. In fact, IHVs want to be able to make silicon-only solutions with no firmware. In order to achieve this, being able to simply jump to a pre-defined offset in a structure in order to extract desired data is necessary. So these attributes can contain the minimal amount of data needed to carry out basic association. The attributes should also be laid out in a pre-defined order and can be present. In fact, it may be desirable to have all of this required data contained within a single attribute. Note that any variable length fields can be at the end of these basic attributes otherwise the offset in the PONG request can change. Any number of attributes may follow in order to provide extended functionality.

Thus, the PONG component 210 can implement the PONG technique described above to transfer provisioning data across the NFC link 206, wherein the NFC link 206 is a trusted medium that allows the safe and secure installation and/or authentication of a device to the network and/or verified device such that the device can utilize the wireless connection associated therewith. Although the PONG technique is described as the technique to transfer such data across the NFC link 206, it is to be appreciated and understood that the provisioning data can be transferred by any suitable and/or efficient technique over the NFC link 206 to allow for the connectivity of devices with a wireless connection (e.g., a wireless local area network (WLAN), Bluetooth, wireless fidelity (Wi-Fi), ultra-wideband (UWB), . . . ). Moreover, the claimed subject matter is not so limited to using the PONG techniques as described above.

Figure 3:
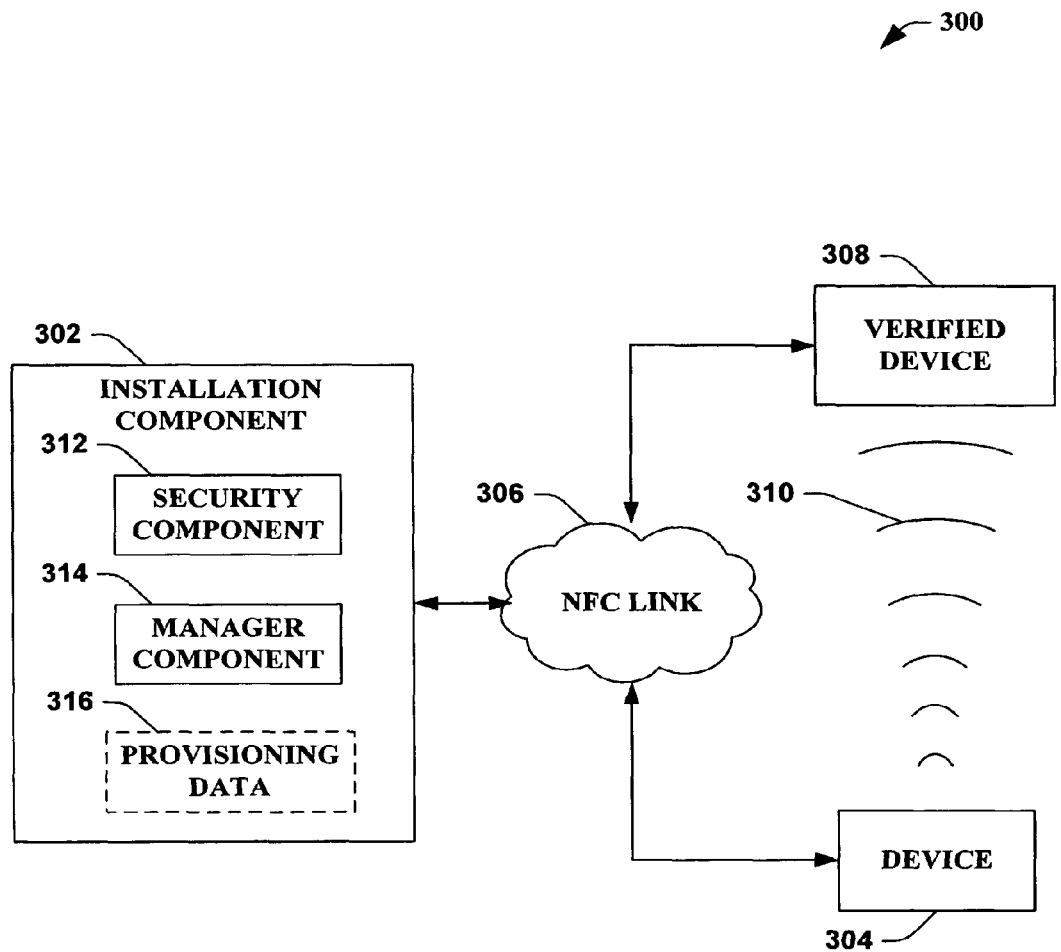
FIG. 3 illustrates a block diagram of an exemplary system that facilitates connecting a wireless device to a secure network by employing near field communications link to exchange provisioning data.

FIG. 3 illustrates a system 300 that facilitates connecting a wireless device to a secure network by employing a near field communications link to exchange provisioning data. A device 304 can utilize an installation component 302 to invoke the provisioning of the device 304 wireless connectivity to a verified device 308 associated with a network (not shown). A NFC link 306 can be utilized to exchange any data (e.g., provisioning data 316) related to the authentication and/or installation of the device 304 onto the network to which the verified device is associated with. Thus, the NFC link 306 enacts as a trusted medium, wherein configuration data (e.g., provisioning data 316) can be exchanged to allow an unverified device, such as device 304, to become connected to the verified device 308 and/or network by a wireless connection 310, wherein the wireless connection can be any suitable wireless connection, such as a wireless local area network (WLAN), Bluetooth, Wi-Fi, ultra-wideband (UWB), etc. It is to be appreciated that the verified device 308 can be any suitable network entity securely associated with the network. Moreover, the device 304, the installation component 302, the NFC link 306, and the verified device 308 can be substantially similar to the components and/or elements described in previous figures. Furthermore, it is to be appreciated and understood that the verified device 308 need not be connected directly to the NFC link 306, yet the verified device 308 can be previously configured to the particular network in order to provision the device 304.

In one example, the verified device 308 can be a personal computer that utilizes a Bluetooth connection for wireless devices, wherein a wireless speaker is unverified and uninstalled to the personal computer. A user can place the wireless speaker close to the personal computer, wherein IWC link 306 can be utilized to allow the installation component 302 to install installation and/or authentication data (e.g., provisioning data). The NFC link 306 can be utilized as a trusted medium based at least in part upon the connection being secure and encrypted over such short distances. Upon completion of the transfer over the NFC link 306, the wireless speaker can be utilized by the personal computer over the Bluetooth connection based at least in part upon the authentication and/or verification over the NFC link 306.

The installation component 302 can include a security component 312 that can ensure security related to the initiation of a NFC link 306 between a device 304 and a verified device 308. For example, although the implementation of NFC link 306 can provide a trusted medium for data exchange, not all close proximity interactions are intended to exchange information for provisioning devices. Thus, the security component 312 can provide an additional security layer such that various security techniques can be employed to ensure the intended, authenticated, and/or verified utilization of NFC link 306 to exchange data related to provisioning a device 304. The security techniques can be employed such as, but not limited to, smart cards, certificates, knowledge of cryptographic keys, user name and password, personal identification number (PIN), time-based proximity, biometric indicia (e.g., fingerprint, inductance, retina, . . . ), human interactive proofs (HIPS), voice recognition, etc. to deter malicious attacks and/or unauthorized provisioning of devices to the network.

The installation component 302 can further include a manager component 314 that can manage any devices, connections, and/or configurations associated with the system 300. For example, the manager component 314 can manage the connectivity of devices (e.g., number, type, location, . . . ), manage proximity settings associated with the NFC link 306 (e.g., time length, distance, range, . . . ), manage the association of the wireless connection, etc. For instance, the manager component 314 can manage which wireless connection 310 a particular device (provisioned by NFC link as a trusted medium) is established upon. Thus, a device 304 can be provisioned utilizing the NFC link 306 as a trusted medium to exchange authentication and/or installation data (e.g., provisioning data 316), wherein the manager component 314 can efficiently associate the device 304 with a network and/or wireless connection 310. In other words, a device can be provisioned via NFC link 306, and the manager component 314 can determine whether a WLAN connection, a Bluetooth, a wireless fidelity (Wi-Fi), WUWB, etc. is most efficient and/or provides the strongest signal to the device 304. In one example, the manager component 314 can deny connectivity based at least upon a threshold of signal strength not being met.

The installation component 302 can utilize a data store (not shown), wherein the data store can store various data related to the system 300. The data store can provide storage for any provisioning data 316, wherein the data can be associated with a network, a particular device, installation protocols, authentication protocols, etc. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Figure 4:
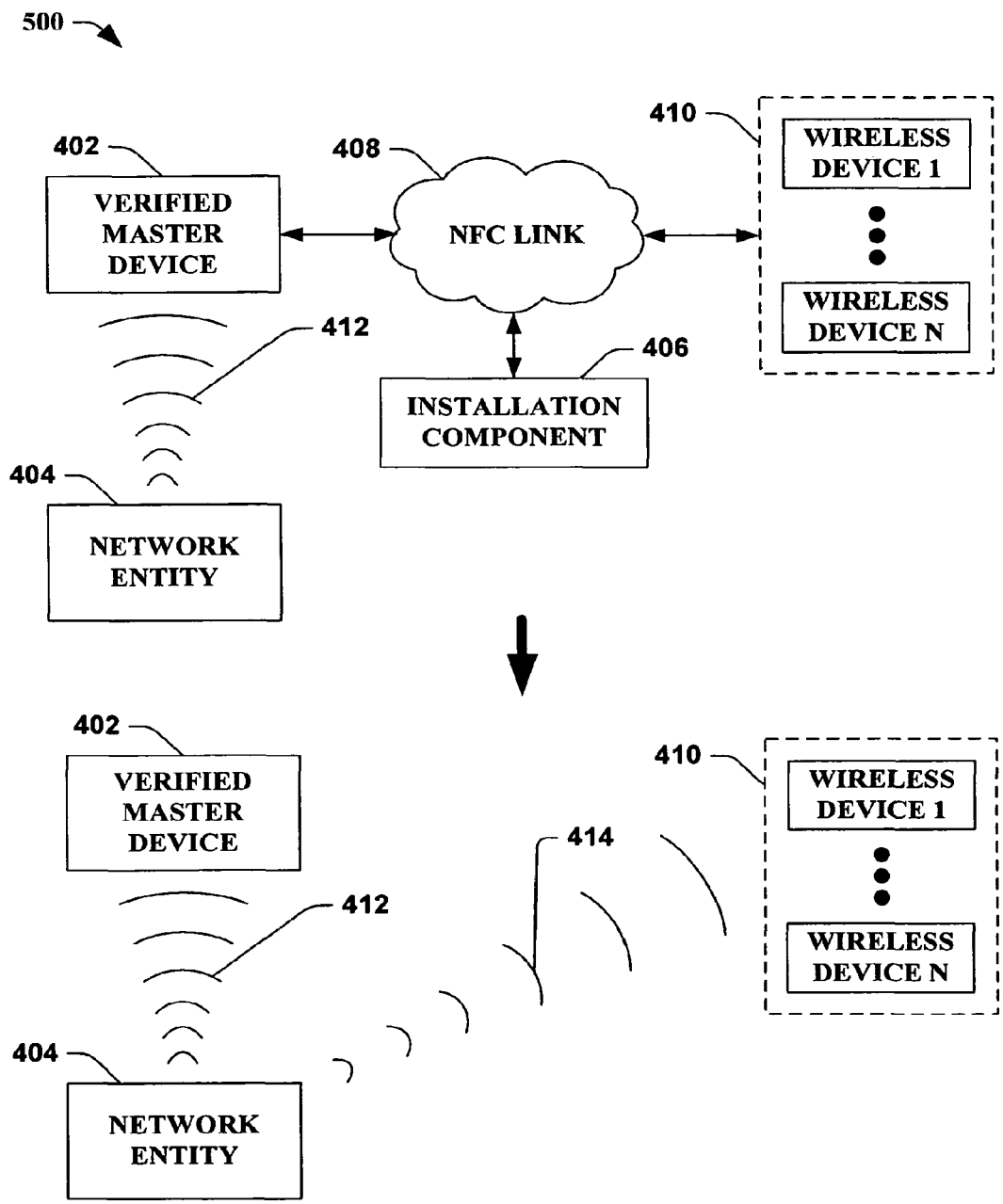
FIG. 4 illustrates a block diagram of an exemplary system that facilitates connecting a plurality of wireless devices to a network utilizing a near field communication link as a trusted medium.

FIG. 4 illustrates a system 400 that facilitates connecting a plurality of wireless devices to a network utilizing a near field communication link as a trusted medium. In general, once a wireless device has been connected to a network entity 404 via a NFC link 408 in which an installation component 406 establishes a wireless connection utilizing provisioning data, the wireless device can be utilized as a verified device, and in particular a verified master device 402 from which a plurality of wireless devices 410 (having a wireless device 1 to wireless device N, where N is an integer greater than or equal to 1) can connect to the network entity 404. It is to be appreciated that the installation component 406, NFC link 408 and the wireless connection can be substantially similar to previously described elements. Furthermore, it is to be appreciated and understood that the verified master device 402 need not be connected directly to the NFC link 408, yet the verified master device 402 can be previously configured to the particular network in order to provision the wireless devices 410.

A user can employ a daisy chain scheme (e.g., a hardware configuration in which devices are connected in series in which signals can be received by each device) utilizing a previously established secure and/or trusted device (referred to as the verified master device 402). A user can place a wireless device not connected to the network and/or network entity 404 within a close proximity of the verified master device 402 such that NFC link 408 can be utilized as a trusted medium to exchange installation and/or provisioning data. Once the NFC link 406 is implemented, the installation component 406 can invoke provisioning data to allow the secure installation and/or connection configuration for such wireless device. Thus, any one and/or all of the plurality of wireless devices 410 can establish a wireless connection 414 that is secure based at least in part upon the exchange of provisioning data between the verified master device 402 and the plurality of wireless devices via NFC link 408. In other words, the verified master device 402 can utilize NFC link 408 to allow any one of the plurality of wireless devices 410 to be provisioned with the network entity 404 based at least in part upon the secured and/or authenticated wireless connection 412 (authenticated and/or verified with or without the use of the trusted medium NFC link 406).

For example, a computer can be a network entity for a plurality of wireless devices such as, but not limited to, wireless mouse, wireless keyboard, wireless monitor, wireless adapter, wireless speakers, wireless headset, wireless microphone, etc. By utilizing the system 400, a user can employ the daisy chain scheme to install the plurality of wireless devices. Once a first device is secured and/or authenticated, such device can be utilized as a verified master device 402, wherein a trusted wireless connection is established therewith. The future wireless devices can be verified by implementing NFC link 408 between a newly introduced wireless device (one of and/or all of the plurality of wireless devices 410) and the verified master device 402. Thus, after a wireless mouse is installed and/or authenticated, the wireless keyboard can be placed in close proximity to allow NFC link 408 to be utilized to exchange provisioning data. Once the NFC link 408 is established, the installation component 406 can invoke the installation and/or authentication of the wireless keyboard utilizing such provisioning data. After the exchange is complete, the computer can have two wireless devices connected via two separate and distinct wireless connections (wireless connection 412 and newly established wireless connection 414).

Figure 5:
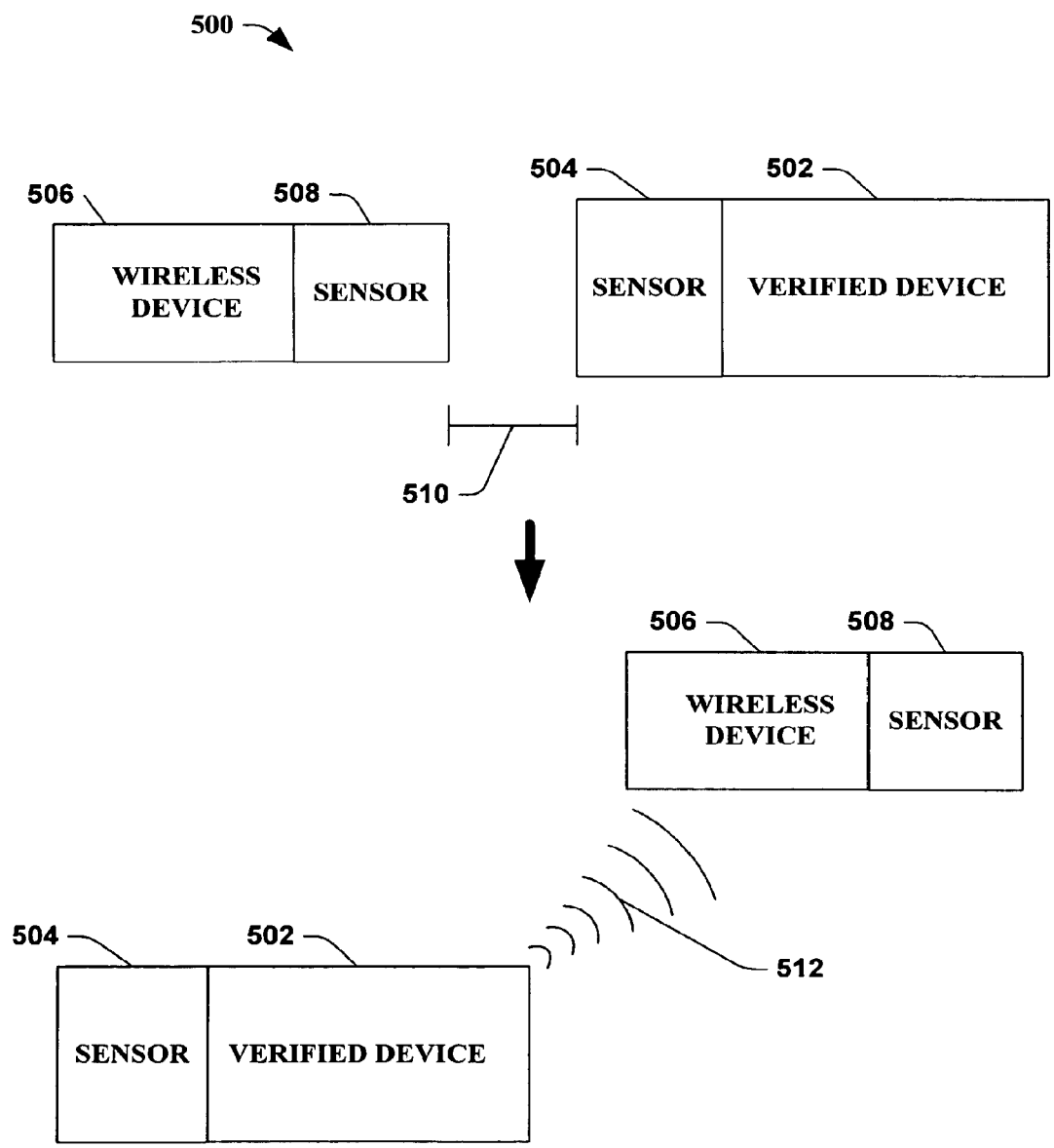
FIG. 5 illustrates a block diagram of an exemplary system that facilitates utilizing a near field communication link to provision a wireless device to a secured wireless network.

FIG. 5 illustrates a system 500 that facilitates utilizing a near field communications link to provision a wireless device to a secured wireless network. The system 500 can include a verified device 502 (e.g., established a secure connection to a network) and a wireless device 506 that is not verified. The wireless device 506 and the verified device can exchange provisioning data during a NFC link connection between the sensor 504 and sensor 508 in order to establish a wireless connection 512. It is to be appreciated that the NFC link connection between the wireless device 506 and the verified device 502 can be initiated based at least in part upon a proximity 510, wherein if the distance of the wireless device 506 and the verified device 502 is less than such proximity 510, the NFC link connection can be established.

The installation component (not shown) can invoke the provisioning data during the NFC link connection provided by the sensors 504 and 508. It is to be appreciated that the installation component can be incorporated into the sensor 508 for the wireless device 506 or within the verified device 502. In other words, the installation component can be incorporated into either the wireless device 506 or within the network (not shown) such that upon the NFC link connection between the sensors 508 and 504, the installation component can invoke the installation and/or authentication of the wireless device utilizing the provisioning data. The sensors 508 and 504 facilitate the complications involved with installing and/or authenticating the wireless device 506 to the verified device 502 by employing the NFC link connection as a trusted medium between such devices. The sensors 508 and 504 can be any suitable sensors associated with a near field communication link that can receive and/or send communications wirelessly within short ranges.

Figure 6:
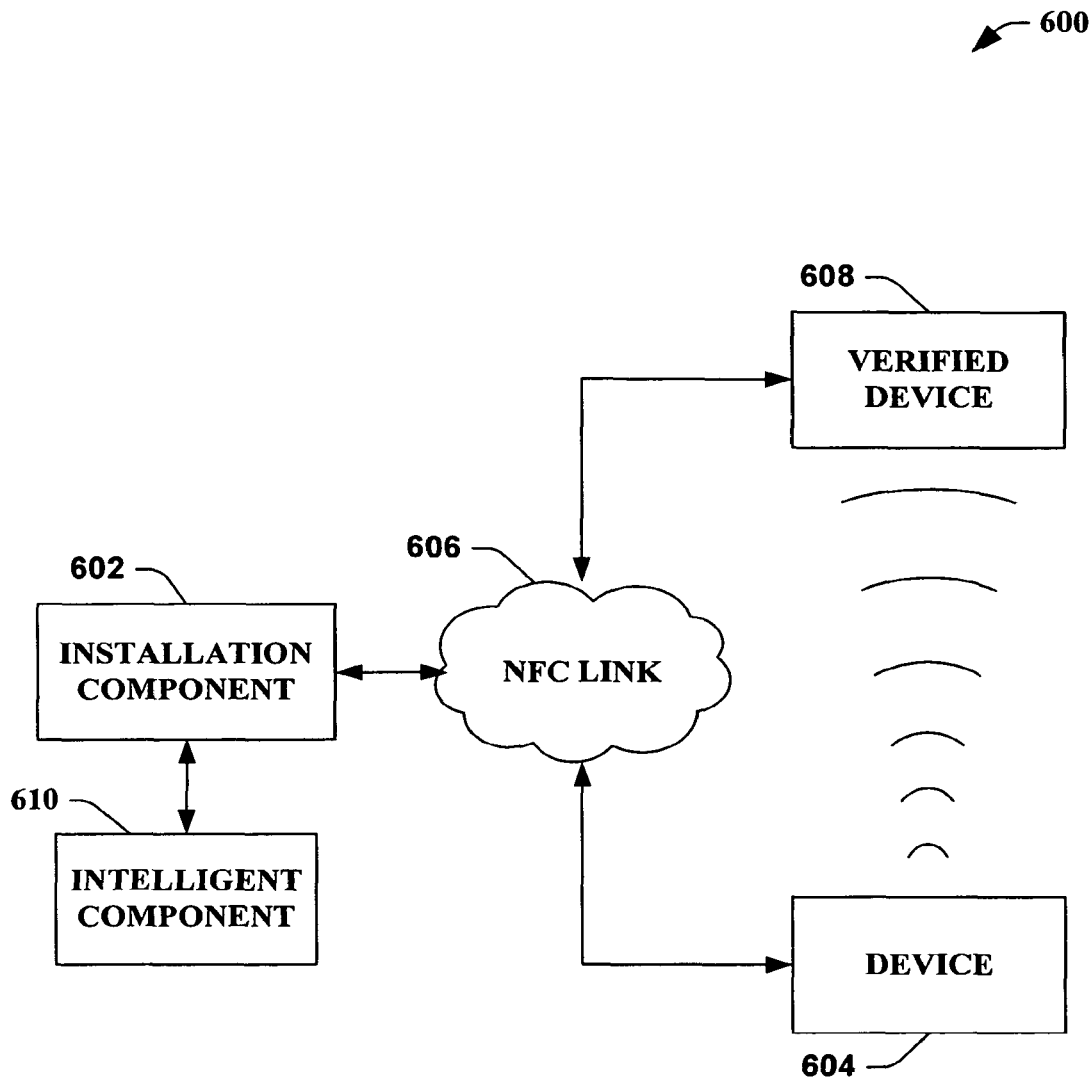
FIG. 6 illustrates a block diagram of an exemplary system that facilitates provisioning a wireless device to a secure network utilizing near field communications.

FIG. 6 illustrates a system 600 that employs intelligence to facilitate provisioning a wireless device to a secure network utilizing a near field communications link. The system 600 can include an installation component 602, a device 604, a NFC link 606, and a verified device 608 that can all be substantially similar to respective components described in previous figures. Furthermore, it is to be appreciated and understood that the verified device 608 need not be connected directly to the NFC link 606, yet the verified device 608 can be previously configured to the particular network in order to provision the device 604. The system 600 further includes an intelligent component 610. The intelligent component 610 can be utilized by the installation component 602 to facilitate provisioning a wireless device to a network and/or a verified device associated with the network. For example, the intelligent component 610 can infer the installation of a particular device to a particular network; whether a close proximity is a valid attempt to exchange provisioning data; association of provisioning data to devices and/or networks, etc.

It is to be understood that the intelligent component 610 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
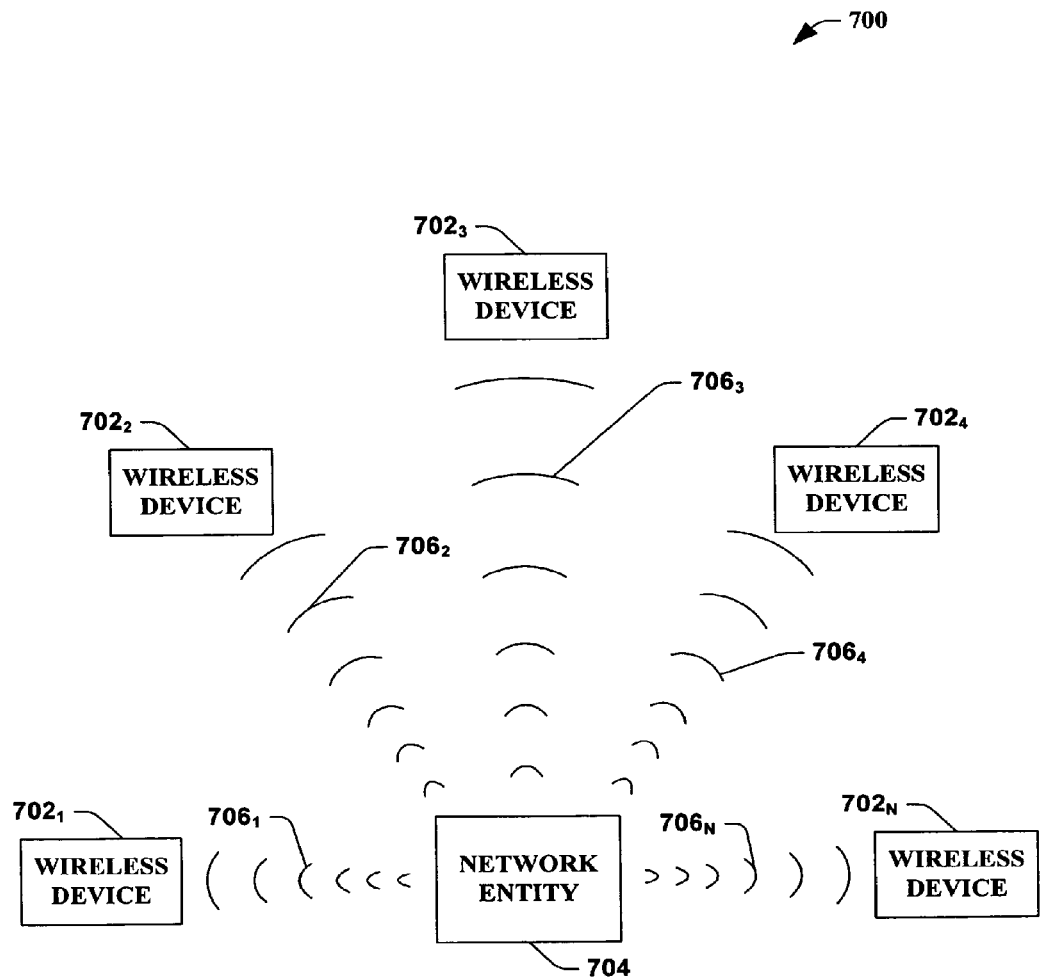
FIG. 7 illustrates a conventional prior art wireless configuration comprising of a plurality of wireless devices.

FIG. 7 illustrates a conventional prior art wireless configuration 700 comprising of a plurality of wireless devices $702_1$, $702_2$, $702_3$, $702_4$, and $702_N$ (collectively referred to as the wireless devices 702) which are connected wirelessly to a network entity 704 to mitigate the use of hard wiring. It is to be appreciated the number of wireless devices connected to a network entity can be 1 to N, where N is an integer greater than or equal to 1. Conventionally, a user would install each wireless device 702 individually finding a network entity 704 to connect in order to establish a wireless connection $706_1$, $706_2$, $706_3$, $706_4$, and $706_N$ (collectively the wireless connections 706, in which each wireless connection relates to a wireless device and where N is an integer as defined above). Once the user selects the intended network entity 704 for installation, authentication of the wireless connection 706 for the wireless device 702 and the network entity 704 can be invoked. Thus, installation is initiated with the network entity 704 detecting a particular wireless device that is in range of the wireless connection 706. The conventional installation and/or authentication procedure/system is extremely problematic. First, a network entity 704 is not aware of new wireless devices 702 being installed or when to look for new devices to install. Also, a wireless device 702 does not know which network entity 704 to establish a wireless connection 706. Second, if the network entity 704 finds wireless devices 702, determination of which wireless devices 702 to install is not known. Third, a wireless device 702 must be within range of the wireless connection 706 for installation and/or authentication. Lastly, authentication and security issues arise with the use of a wireless connection 706 such as, but not limited to, PIN limitations, "sniffing," password limitations, etc.

For example, a typical security measure invoked is the use of PINS which regulate wireless adapters that are authenticated to connect to the wireless router. In the present example, a user can provide a universal PIN which provides the wireless adapter to connect to the wireless router. However, the PIN is limited by what the user can remember and the character values that are compatible to each side (e.g., the wireless device side and the network entity side). For example, some PIN limitations can be requirements on the length, containing numbers, being different than user name, not incorporating user name, certain characters (e.g., *, -, . . . ), capital and lower case letters, . . . . Moreover, the PIN is vulnerable to "sniffing" from hackers who attempt to steal PINS to connect to the wireless router.

In another example involving conventional installation and/or authentication procedures/systems, universal interfaces (UIs) are provided on the network entity 704 and/or the wireless device 702. However, wireless keyboard installation and/or authentication to a computer (e.g., network entity) with a UI can be problematic. By utilizing a UI, a user needs to navigate within the interface in order to install the wireless keyboard. Yet, navigation through a UI can be troublesome without the aid of a keyboard. Since the user is installing a keyboard, one can not be used to navigate through the UI. Additionally, the simultaneous installation of multiple wireless devices 702 can cause immense confusion and complications for the network entity 704. Thus, the subject claimed matter mitigates the complications that arise with conventional installation and/or authentication systems and methods. By utilizing the NFC link as a trusted medium to exchange provisioning date, a secure data exchange can be utilized without compromising security constraints associated with wireless devices, networks, and/or network entities.

Figure 8:
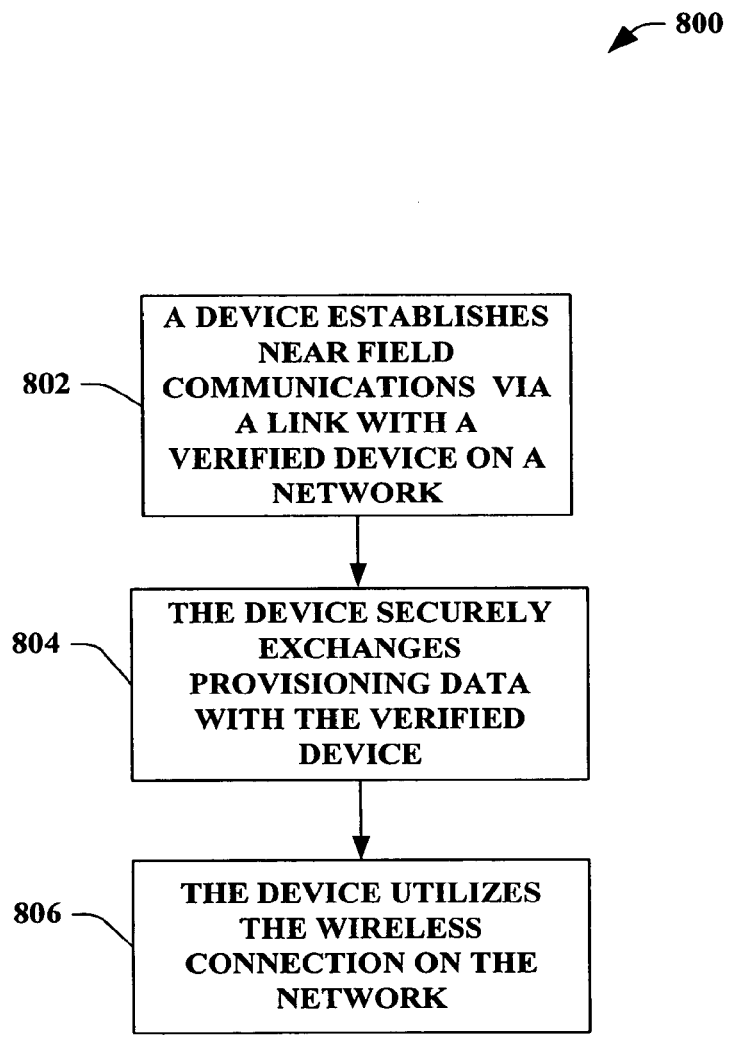
FIG. 8 illustrates an exemplary methodology that facilitates provisioning a wireless device to a secure network by employing a near field communication link to exchange provisioning data.
Figure 9:
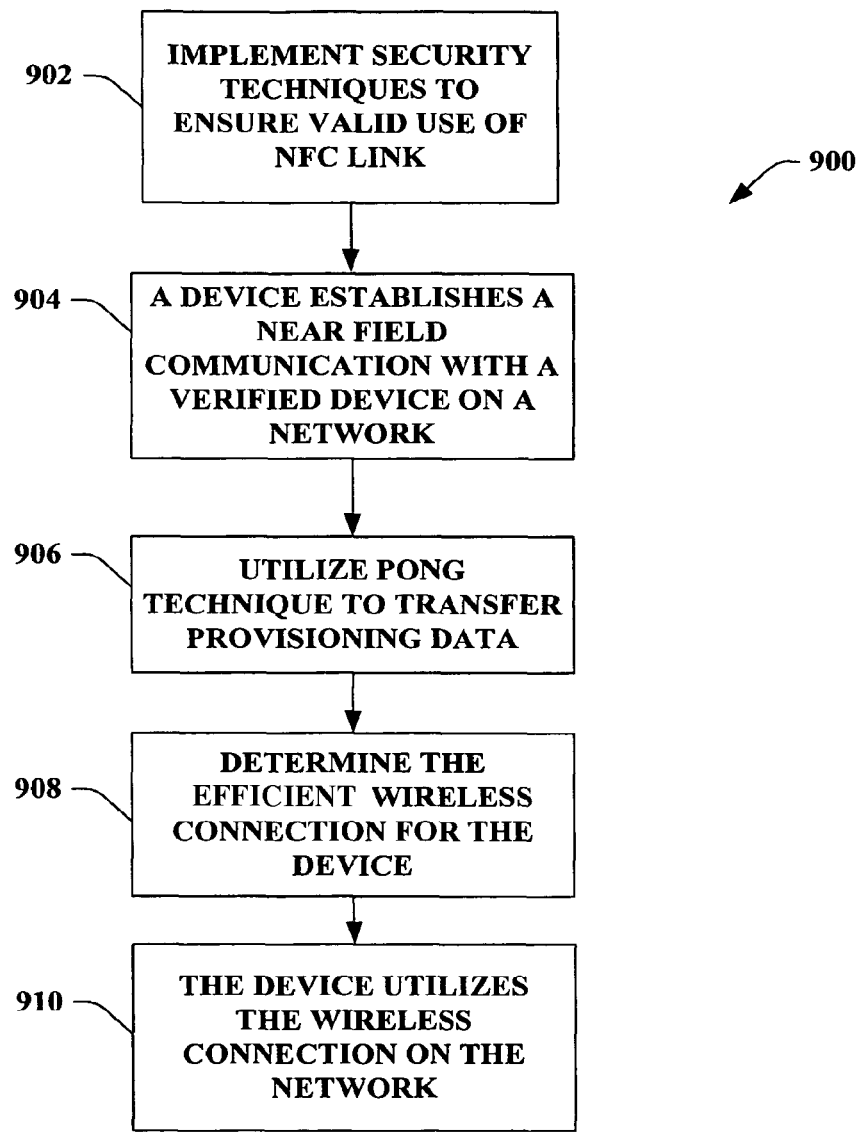
FIG. 9 illustrates a methodology 900 for securely installing a device to a secure network by utilizing a near field communications link.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 8 illustrates a methodology 800 for provisioning a wireless device to a secure network by employing a near field communications link to exchange provisioning data. At reference numeral 802, a device can establish a near field communications (NFC) link with a verified device on a network and/or a network entity. The device can be any suitable device capable of a wireless connection and capable of NFC. Moreover, the verified device can be any device that had been previously secured to the network and/or a network entity utilizing a wireless connection and/or a hardwire connection. At reference numeral 804, the device can securely exchange provisioning data with the verified device utilizing the NFC link as a trusted medium. The NFC link can provide a secure and encrypted link over a short proximity and/or distance with a large bandwidth capable of handling the transfer of provisioning data. At reference numeral 806, the device can utilize the wireless connection on the network and/or associated with the network entity and/or verified device. After the secure transfer of provisioning data to the network, the device can be considered provisioned and the wireless connection can be utilized. It is to be appreciated that the wireless connection can be, but is not limited to, a wireless local area network (WLAN), Bluetooth, wireless fidelity (Wi-Fi), ultrawideband (UWB), etc.

FIG. 9 illustrates a methodology 900 that facilitates securely installing a device to a secure network by utilizing a near field communications link. At reference numeral 902, a security technique can be implemented to ensure the validity of utilizing the near field communications (NFC) link for a trusted medium to transfer provisioning data related to a device. For instance, the security techniques can be, but are not limited to, a user name and password, personal identification number (PIN), a login, time-based proximity, biometric indicia (e.g., fingerprint, inductance, retina, . . . ), human interactive proofs (HIPS), voice recognition, etc. Once the security techniques ensure the use of NFC link, the communication channel can be utilized to transfer data securely (e.g., secured in two layers).

At reference numeral 904, a device can establish the near field communications (NFC) link with a verified device on a network. After the security techniques have been passed and/or initiated, the NFC link can be utilized as a trusted medium for which the device can communicate to the network and/or network entity. At reference numeral 906, a plug and go (PONG) technique can be implemented to transfer provisioning data to the network, network entity and/or verified device. The PONG technique can be considered generic enough to allow the provisioning of any suitable wireless device that employs various wireless connections (e.g., WLAN, Wi-Fi, Bluetooth, UWB, . . . ).

At reference numeral 908, the strongest wireless connection from the network can be determined based at least in part upon a statistical analysis. The device can receive a plurality of wireless signals within a particular network. Thus, after the provisioning of the device, a determination can be made as to which wireless connection and/or signal can provide the most efficient and/or strongest connection. Once a determination is made on which wireless connection is most suitable for the device, the device can utilize the wireless connection on the network at reference numeral 910.

Figure 10:
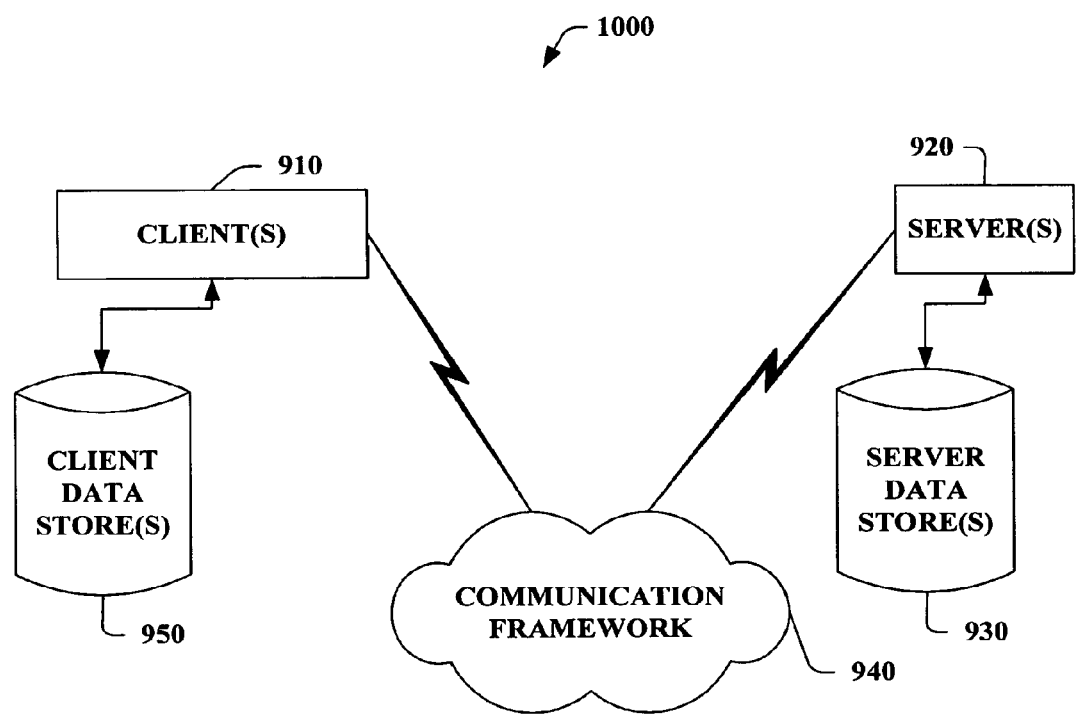
FIG. 10 illustrates an exemplary networking environment, wherein the novel aspects of the claimed subject matter can be employed.
Figure 11:
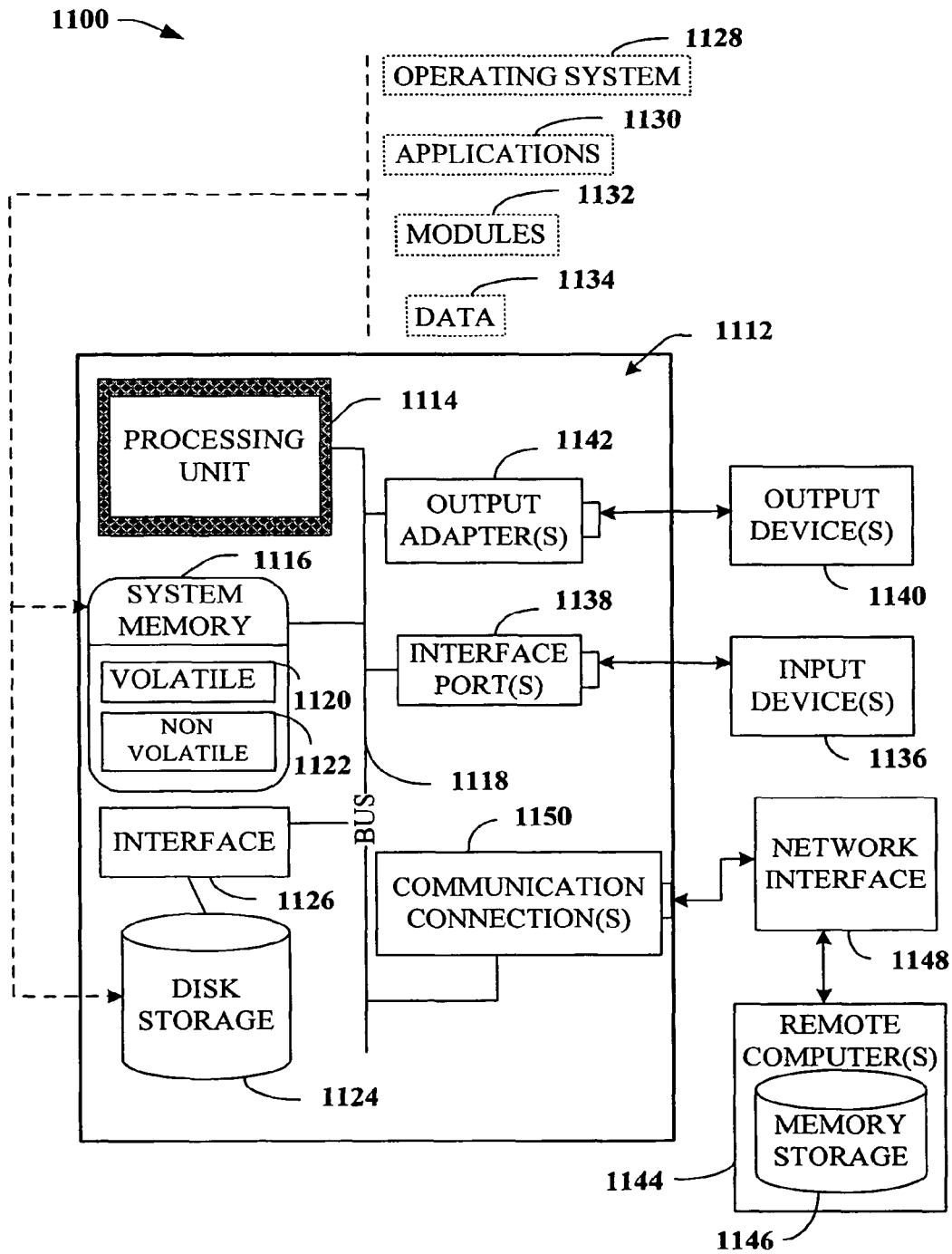
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1 148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A system that facilitates connecting to a wireless network via a verified device that is provisioned to operate on the wireless network via a first wireless connection that is not a near field communication link, comprising:
a wireless device that establishes a near field communication link with the verified device; and
an installation component that invokes an exchange of provisioning data between the device and the verified device via the near field communication link and uses the provisioning data to establish a second wireless connection distinct from the near field communication link between the device and the verified device whereby the device may communicate with the wireless network via said second wireless connection, the installation component establishing the second wireless connection as an ad hoc network between the wireless device and the verified device to enable connectivity therebetween.

2. The system of claim 1, wherein the provisioning data includes installation protocols, authentication protocols, data related to acquiring a connection with the wireless network, device configuration data, and/or device related data.

3. The system of claim 1, wherein the provisioning data is employed by the installation component to authenticate the device.

4. The system of claim 1, wherein the verified device is indirectly connected to the near field communication link.

5. The system of claim 1, wherein the installation component is incorporated into the wireless device and/or the verified device.

6. The system of claim 1, wherein the wireless device is at least one of the following: a computer; a network; a keyboard; a speaker; a mouse; a monitor; a headset; a pair of headphones; a remote; a router; an access point; a printer; a hard drive; a modem; a phone; a cellular communication device; a portable digital assistant (PDA); and a microphone.

7. The system of claim 1, wherein the second wireless connection is at least one of a wireless local area network (WLAN), Bluetooth™, wireless fidelity (Wi-Fi), and ultra-wideband (UWB).

8. The system of claim 1, wherein the wireless device and/or the verified device include sensors that enables the wireless device and/or verified device to detect each other as being in sufficient proximity of each other to establish said near field communication link.

9. A system that facilitates connecting to a wireless network via a verified device that is provisioned to operate on the wireless network via a first wireless connection that is not a near field communication link, comprising:
a wireless device that establishes a near field communication link with the verified device; and
an installation component that invokes an exchange of provisioning data between the device and the verified device via the near field communication link and uses the provisioning data to establish a second wireless connection distinct from the near field communication link between the device and the verified device whereby the device may communicate with the wireless network via said second wireless connection, wherein the installation component comprises a security component that provides an additional security layer to ensure valid utilization of close proximity data transfer with respect to the near field communication link.

10. The system of claim 9, wherein the security layer includes at least one of the following security techniques: a smart card; a certificate; a cryptographic key; a user name and password; a personal identification number (PIN); a login; a time-based proximity; a biometric indicia; a human interactive proof (HIP); and a voice recognition.

11. The system of claim 9, wherein the security component ensures valid utilization of the close proximity data transfer over the near field communication link based on close temporal proximity of the exchange of provisioning data to another event.

12. The system of claim 9, wherein the installation component further comprises a manager component that manages at least one of the wireless device connectivity to the wireless network, association of one of a plurality of wireless connections associated with the wireless network, and a proximity setting related to the near field communications.

13. The system of claim 12, wherein the manager component utilizes statistical analysis to determine the most efficient wireless connection for the wireless device from a plurality of wireless connections associated with the wireless network based upon identifying the wireless connection with the highest signal strength to the wireless device.

14. The system of claim 13, wherein the manager component denies establishment of the wireless connection upon a signal strength of the wireless device to the wireless network being below a threshold and establishing the wireless connection upon the signal strength not being below the threshold.

15. The system of claim 1, wherein the installation component comprises a data store that stores said provisioning data.

16. A system that facilitates connecting to a wireless network via a verified device that is provisioned to operate on the wireless network via a first wireless connection that is not a near field communication link, comprising:
a wireless device that establishes a near field communication link with the verified device; and
an installation component that invokes an exchange of provisioning data between the device and the verified device via the near field communication link and uses the provisioning data to establish a second wireless connection distinct from the near field communication link between the device and the verified device whereby the device may communicate with the wireless network via said second wireless connection,
wherein the verified device comprises a master device that has been previously connected to the wireless network, wherein a plurality of said devices can connect to a wireless connection associated with the network utilizing provisioning data provided via a near field connection link with the master device.

17. A system that facilitates connecting to a wireless network via a verified device that is provisioned to operate on the wireless network via a first wireless connection that is not a near field communication link, comprising:
a wireless device that establishes a near field communication link with the verified device; and
an installation component that invokes an exchange of provisioning data between the device and the verified device via the near field communication link and uses the provisioning data to establish a second wireless connection distinct from the near field communication link between the device and the verified device whereby the device may communicate with the wireless network via said second wireless connection,
wherein the wireless device, once authenticated, becomes a verified device that is configured to establish a second near field communication link with a second device on the wireless network by invoking transfer of provisioning data to the wireless network via the second near field communication link.

18. A system that facilitates connecting to a wireless network via a verified device that is provisioned to operate on the wireless network via a first wireless connection that is not a near field communication link, comprising:
a wireless device that establishes a near field communication link with the verified device;
an installation component that invokes an exchange of provisioning data between the device and the verified device via the near field communication link and uses the provisioning data to establish a second wireless connection distinct from the near field communication link between the device and the verified device whereby the device may communicate with the wireless network via said second wireless connection; and
an intelligent component that is utilized by the installation component to facilitate provisioning the device to the wireless network and/or the verified device by employing probabilistic and/or statistical based analysis to infer that a user of the wireless device wishes to connect to the wireless network.

19. A method that facilitates connecting a wireless device to a wireless network, comprising:
a processor executing instructions to perform the following steps:
establishing a near field communication link between the wireless device and a verified device on the wireless network, wherein the verified device is provisioned to operate on the wireless network via a first wireless connection that is different from the near field communication link;
securely exchanging provisioning data between the wireless device and the verified device across the near field communication link;
establishing a second wireless connection distinct from the near field communication link between the wireless device and the verified device using said provisioning data, whereby the wireless device may communicate with the wireless network via said second wireless connection; and
ensuring valid utilization of the close proximity data transfer over the near field communication link based on close temporal proximity of the exchange of provisioning data to another event.

20. The method of claim 19, further comprising:
authenticating the wireless device using the provisioning data.

21. The method of claim 19, further comprising:
implementing a security technique to ensure valid use of the near field communication link by the wireless device; and
determining an efficient wireless connection for the wireless device to utilize on the wireless network.

22. A computer readable storage medium storing instructions thereon that when executed by a processor facilitates the connection of a wireless device to a wireless network, said instructions, when executed, causing said processor to perform the following steps:
establish a near field communication link between the wireless device and a verified device on the wireless network, wherein the verified device is provisioned to operate on the wireless network via a first wireless connection that is different from the near field communication link;
securely exchange provisioning data between the wireless device and the verified device across the near field communication link;
establish a second wireless connection distinct from the near field communication link between the wireless device and the verified device using the provisioning data, whereby the wireless device may communicate with the wireless network via said second wireless connection; and
ensuring valid utilization of the close proximity data transfer over the near field communication link based on close temporal proximity of the exchange of provisioning data to another event.

23. A medium as in claim 22, further comprising instructions that, when executed, cause said processor to authenticate the wireless device using the provisioning data.

* * * * *